(12) United States Patent
Terada

(10) Patent No.: US 7,391,432 B2
(45) Date of Patent: Jun. 24, 2008

(54) VIDEOCONFERENCE SYSTEM

(75) Inventor: Masahiro Terada, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1191 days.

(21) Appl. No.: 10/066,373

(22) Filed: Feb. 5, 2002

(65) Prior Publication Data

US 2002/0109770 A1 Aug. 15, 2002

(30) Foreign Application Priority Data

Feb. 9, 2001 (JP) .............................. 2001-034469

(51) Int. Cl.
*H04N 7/14* (2006.01)
(52) U.S. Cl. ................................. 348/14.08; 348/14.03
(58) Field of Classification Search .............. 348/14.08, 348/14.03, 207.1
See application file for complete search history.

(56) References Cited

U.S. PATENT DOCUMENTS

| | | | |
|---|---|---|---|
| 6,259,469 B1* | 7/2001 | Ejima et al. ............... | 348/14.01 |
| 6,317,609 B1* | 11/2001 | Alperovich et al. ...... | 348/14.01 |
| 6,657,654 B2* | 12/2003 | Narayanaswami ....... | 348/14.04 |
| 6,693,661 B1* | 2/2004 | Vanderwilt et al. ....... | 348/14.01 |
| 6,715,003 B1* | 3/2004 | Safai ..................... | 348/207.99 |
| 2002/0095501 A1* | 7/2002 | Chiloyan et al. ............ | 709/227 |

FOREIGN PATENT DOCUMENTS

| | | |
|---|---|---|
| JP | 59-154840 | 9/1984 |
| JP | 60-178784 | 9/1985 |
| JP | 62-157491 | 7/1987 |
| JP | 7-71275 | 7/1995 |
| JP | 9-9014 A | 1/1997 |
| JP | 9-23374 A | 1/1997 |
| JP | 11-346166 A | 12/1999 |
| JP | 2000-99697 A | 4/2000 |
| JP | 2000-165726 A | 6/2000 |
| JP | 2000-285168 A | 10/2000 |
| JP | 2000-287072 A | 10/2000 |
| JP | 2000-324375 A | 11/2000 |
| JP | 2000-347839 A | 12/2000 |
| JP | 2001-16539 A | 1/2001 |
| WO | WO-99/35826 A1 | 7/1999 |

\* cited by examiner

*Primary Examiner*—Stella Woo
(74) *Attorney, Agent, or Firm*—Birch, Stewart, Kolasch & Birch, LLP

(57) ABSTRACT

This videoconference system includes plural user's user PCs, a digital camera that is connected to each user PC through a cradle and can take a moving image, a server for a videoconference, and the Internet that connects these user PCs and the server for a videoconference. Each user PC has a program for videoconference for performing a videoconference, and when detecting that the digital camera is mounted on the cradle and is connected to the user PC duplex-communicably, the user PC makes a videoconference possible by automatically booting the above-described program for videoconference, and making moving images, taken with digital cameras of both users who are mutually communication, displayed on display devices of both user PCs.

17 Claims, 7 Drawing Sheets

VIDEOCONFERENCE SYSTEM

BACKGROUND OF THE INVENTION

1. Field of the Invention

The present invention relates to a videoconference system, and in particular, to a videoconference system by which a plurality of users holds a videoconference with each other via a communication network.

2. Description of the Related Art

Japanese Patent Application Publication No. 59-154840 discloses a teleconference system which can mutually connect a plurality of stations so that broadcasting type communication may be possible, can make each station being equipped with an input unit and a display device, can connect stations, which participate in a conference by the transmission of a conference request, including a conference participating station list, from a station, logically as a group, and can perform exclusive control of excluding an access to the display device and input unit from a station other than the group during group formation.

However, although the teleconference system performs the exclusive control of excluding an access from stations other than a group, there arises a malfunction that it is not possible to easily select a partner who can hold a teleconference or to easily perform initial registration work relating to a teleconference.

Japanese Patent Application Publication No. 60-178784 discloses an image receiving apparatus which has an image display device displaying a user's own image under transmission in a mirror image or a normal image on a half or a part of a screen at the same time of displaying an image from a partner.

However, although the image receiving apparatus displays an image under transmission from a user's own side with a communication partner's pickup image during operation of a videophone on an image display device, there arises a malfunction that it is impossible to easily select a partner who can perform a videophone or to easily select an image, which has been taken and recorded beforehand, and to transmit the image to a partner.

Japanese Patent Publication No. 7-71275 discloses a teleconference system that has a plurality of image pickup devices which take moving images of a plurality of conference attendants and a plurality of audible sound input devices of inputting audible sound, and in which a plurality of conference unit systems, transmitting moving image data and audible sound data from each device, is connected through a line. The teleconference system comprises an identification device of determining a speaker out of the plurality of conference attendants, a transmitter of generating identification information showing the speaker who is determined by this identification device and transmitting this identification information via the line, a receiver of receiving the identification information from the line, and a display device of dividing a screen into a plurality of areas, displaying the moving image of the speaker on a predetermined area of the divided screen on the basis of moving image data of the speaker corresponding to the identification information received by the receiver while displaying a still image of other conference attendants on the basis of moving image data of the attendants other than the speaker on another area of the divided screen.

However, although the teleconference system displays an image of a plurality of conference attendants on a screen, specifies a speaker, and performs moving image display in a predetermined area, there arises a malfunction that it is impossible to easily select a partner who can perform a videophone or to easily select an image, which has been taken and recorded beforehand, and to transmit the image to a partner.

In recent years, it becomes possible to hold a videoconference with other users through the Internet. Another known system is a system that a user's personal computer acquires and displays a list of plural users that are registered in a predetermined server on a network and ready for communication, and that the user can select a partner, whom the user expects, from the list and can perform a videophone type network meeting.

Generally, when a user logs in to a communication network such as the Internet to enable actual use, personal information such as a name, an address, a payment method of a charge, and an e-mail address which the user inputs is recorded in a predetermined server of a provider or the like, or a user's own communication terminal (communication equipment such as a personal computer, an electronic camera, or a cellular phone). However, up to now, when first starting software for a videoconference for communication via a network, it was necessary to input the personal information and the like anew. Hence, in spite of maintenance of an environment where a videoconference can be held, there arises a situation that users who do not like troublesome operation pass the time away without registering and using a videoconference system. Although a user tries the registration of personal information, there arises a malfunction that it is not possible to set the videoconference system in a state that the videoconference system can be used since the user fails the input of the personal information to be set in many items.

In the above-described network meeting system, there arises a malfunction that a user cannot look for a desired communications partner as a matter of fact since the number of users who can communicate and are registered into a server has reached a huge amount, that is, thousands of people with the spread of the Internet.

Moreover, in the above-described network meeting system, it is possible to acquire other users' names and addresses that are registered into a specific server, and the information of rough communication availability of whether other users have started application software for a specific network meeting, and to display them on a user's personal computer. However, since the information is displayed in characters with which the user can seldom recognize a communication partner easily, it is difficult to specify and select a desired communication partner in fact.

Furthermore, since a user cannot easily know information on whether a desired communication partner is ready for performing a network meeting and a plurality of status information about communication availability of the desired communication partner, there arises a malfunction that it is difficult to predict inconvenience which will be generated after actually performing a network meeting.

Up to now, during a network meeting with another user, when transmitting one or more images, which were taken by an electronic camera etc. and are currently recorded, to the partner, the user boots a file management program other than application software for a network meeting simultaneously, and commands transmission after selecting an image file that the user wishes to transmit. Nevertheless, even if the file management program displays a list of a file name including a drive name of a recording device or a directory name where the desired image is recorded, it is not possible to grasp the contents of an image only from a file name. Hence, the user performs such complicated image transmission operation that the user specifies the file name of the image to be sent, views and checks the image, and commands transmission thereafter.

Furthermore, when a plurality of images are sent, it is necessary to perform troublesome processing so as to send the plurality of images since it is necessary to perform the above-described processing for the plurality of images.

SUMMARY OF THE INVENTION

The present invention is made in view of such a situation, and aims to provide a videoconference system that does not need complicated operation, makes it possible that a user can easily participate in a videoconference, facilitates initial registration at the time of first starting the use of the videoconference system, makes it possible to easily select a desired partner at the time of starting the videoconference, and can easily select and send an image, which has been already taken, during the operation of the videoconference.

In order to achieve the above-described object, the present invention is directed to a videoconference system that comprises a computer of each user, which can communicate mutually via a communication network, and an electronic camera of each user with which a moving image can be taken and which is connected to the computer duplex-communicably, and makes a videoconference possible by making a moving image, taken by the electronic camera of each user, displayed on a display device of a computer of a communication partner, and is characterized in that the computer has a program for videoconference for performing the videoconference, and that the program for videoconference is automatically booted when it is detected that the electronic camera is connected duplex-communicably.

That is, when an electronic camera is connected to a computer duplex-communicably, the computer automatically starts a program for videoconference, and makes it possible to hold a videoconference.

Preferably, the videoconference system further comprises a cradle where the electronic camera is detachably mounted, and a communication cable connecting the cradle to a computer, and characterized in that the cradle connects the electronic camera with the communication cable when the electronic camera is mounted. That is, a videoconference can be held just by mounting an electronic camera on a cradle.

Preferably, the electronic camera has a photography/playback mode, and a communication mode where either of a videoconference mode, where the electronic camera is made to operate as a camera for a computer, and a mass storage class mode where the electronic camera is made to operate as a card reader is set, that the electronic camera automatically sets itself in the communication mode when detecting that the electronic camera is connected to the computer duplex-communicably, and that the computer automatically boots the program for videoconference when the communicate mode that is set is a videoconference mode.

Preferably, the computer has a program for videoconference, and a program for image display, and that the computer automatically boots the program for videoconference and the program for image display when the computer detects that the electronic camera is connected duplex-communicably.

The present invention is also directed to a videoconference system that comprises a computer of each user, which can communicate mutually via a communication network, and an electronic camera of each user with which a moving image can be taken and which is connected to the computer duplex-communicably, and makes a videoconference possible by making a moving image, taken by the electronic camera of each user, displayed on a display device of a computer of a communication partner, and is characterized in that the computer has a program for videoconference for performing the videoconference, and that the computer makes the program for videoconference operate only when it is detected that the electronic camera is connected duplex-communicably and is a predetermined model.

Preferably, the predetermined model of electronic camera is an electronic camera which has a function of treating the program for videoconference, or an electronic camera that has a function of treating the program for videoconference and is produced by a predetermined manufacturer. Namely, only in the case that an electronic camera connected to a computer is a predetermined model that can transmit a moving image to a computer in a predetermined communication mode, the above-described program for videoconference can be booted.

The present invention is also directed to a videoconference system that comprises a computer of each user, which can communicate mutually via a communication network, and an electronic camera of each user with which a moving image can be taken and which is connected with the computer duplex-communicably, and makes a videoconference possible by making a moving image, taken by the electronic camera of each user, displayed on a display device of a computer of a communication partner, characterized in that the computer has a program for videoconference for performing the videoconference, and that the program for videoconference makes the computer perform a function of using personal information of a user at the time of user registration by another program. Namely, since a user does not need to anew perform user registration with a program for videoconference, time and effort can be saved.

Preferably, the other program is a program for image display simultaneously booted at the time of the program for videoconference being booted.

Preferably, the program for image display makes the computer execute a function of making a display device of the computer simultaneously display an image recorded in a recording medium in the electronic camera, or a list of images currently recorded in a recording medium in the computer, and a menu button of commanding the computer to connect to a server performing various kinds of services, and a function of making a server, which is selected by the menu button, transmit an image selected from the list of images.

Preferably, the program for videoconference makes the computer execute a function of making an image, which is selected, transmitted to a communication partner when the image is selected from the list of images during communication and image transmission is commanded. Owing to this, it becomes possible to easily send an image to a communication partner.

The present invention is also directed to a method of generating an address book for recording an image, which is transmitted from another user's communication equipment during a videoconference that is held while mutually transmitting and receiving images, which are taken, between a user's own communication equipment and another user's communication equipment, by associating the image with registration information such as an address of the other user who perform the videoconference, characterized by comprising a step of receiving and displaying an image from another user's communication equipment, a step of a user inputting a command of recording the image that is displayed, a step of recording an image, received on the basis of the command of recording the image, the command which is inputted, by associating the image with address information which shows a communication place of another user under communication, and a step of displaying the address, which shows the communication place of the other user, by associating the address with the image that is recorded.

Namely, it is possible that a still image or a part of a moving image is fetched from the moving image, which show a communication partner, during communication and this is incorporated into an address book relating to the communication partner.

The present invention is also directed to an image transmitting method for transmitting an image, which a user specifies in a videoconference, to another user's communication equipment, characterized by comprising a step of another user's communication equipment and user's own communication equipment performing voice or image communication, a step of displaying the voice or image as one or more image menus on a display device of user's own communication equipment, a step of selecting an image, which the user desires to transmit, from the image menu during the communication, a step of the user commanding the transmission of the image which the user select during the communication, and a step of transmitting the image, which the user selects, to another user's communication equipment during the communication on the basis of the command of communication that the user inputs. Thereby, an image can be easily sent to a communication partner.

The present invention is also directed to an address book display method for displaying information about a user, who is a partner in a videoconference and has been registered beforehand, in a list when the videoconference that is held while transmitting and receiving images, which are being taken, between user's own communication equipment and another user's communication equipment is started, characterized by comprising: a step of displaying partner information such as a name, and an address of a user, the address which shows a communication place, the user who is a partner in a videoconference, a message or a comment, and a photograph of the communication partner on a display device of the user's own communication equipment; a step of acquiring information about communication availability of the partner in the videoconference from other communication equipment; and a step of displaying the information about communication availability of the partner in the videoconference, which is obtained, by associating the information with the information about the partner. That is, just by opening a user's own address book, it is possible to easily search a partner with whom the user can communicate.

Preferably, the address book display method further comprises a step of acquiring partner information such as a name, and an address of a user, the address which shows a communication place, the user who is a partner in a videoconference, a message or a comment, and a photograph of the communication partner through a communication network from other communication equipment.

Preferably, the communication availability is displayed by using a pattern or a character.

The present invention is also directed to a communication partner setup method for displaying information about a user, who is a partner in a videoconference and has been registered beforehand, in a list and for setting a communication partner when the videoconference held while transmitting and receiving images, which are being taken, between user's own communication equipment and another user's communication equipment is started, characterized by comprising: a step of displaying partner information such as a name, and an address of a user, the address which shows a communication place, the user who is a partner in a videoconference, a message or a comment, and a photograph of the communication partner on a display device of the user's own communication equipment; a step of acquiring information about communication availability of the partner in the videoconference from other communication equipment and selecting a partner who cannot presently perform the videoconference on the basis of the communication availability that is obtained; a step of displaying the information about communication availability of the partner in the videoconference, which is obtained, by associating the information with the information about the partner; and a step of giving the user a notice of rejecting user's selection if the user selects the partner, with whom the user cannot presently hold the videoconference, as a partner in the videoconference. That is, if a partner cannot receive communication, it is not possible to select the partner as a communication partner in an address book.

The present invention is also directed to a communication partner setup method for displaying information about a user, who is a partner in a videoconference and has been registered beforehand, in a list and for setting a communication partner when the videoconference that is held while transmitting and receiving images, which are being taken, between user's own communication equipment and another user's communication equipment is started, characterized by comprising: a step of displaying partner information such as a name, and an address of a user, the address which shows a communication place, the user who is a partner in a videoconference, a message or a comment, and a photograph of the communication partner on a display device of the user's own communication equipment; a step of acquiring information about communication availability of a partner in the videoconference from other communication equipment and selecting a partner who can presently perform the videoconference on the basis of the communication availability that is obtained; a step of displaying the information about communication availability of the partner in the videoconference, which is obtained, by associating the information with the information about the partner; and a step of permitting selection and starting the videoconference with an address of a user who is the partner whom the user selects only when the user selects the partner with whom the user can hold the videoconference.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereafter, preferable embodiments of a videoconference system according to the present invention will be described with reference to accompanying drawings.

Figure 1:
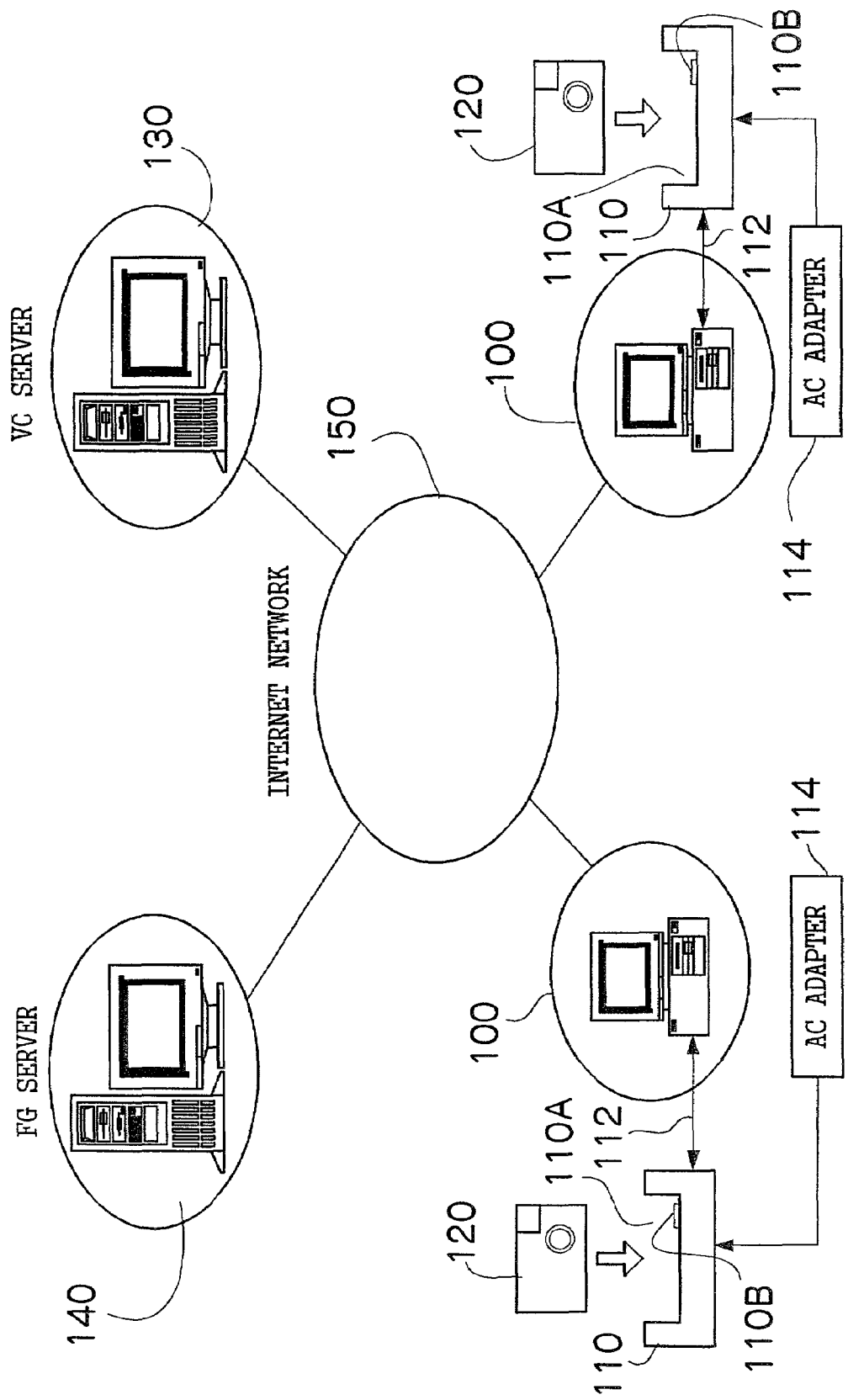
FIG. 1 is an entire structural diagram of a videoconference system according to an embodiment of the present invention.

FIG. 1 is an entire structural diagram of a videoconference system according to an embodiment of the present invention. As shown in FIG. 1, this videoconference system comprises a plurality of users' computers (hereinafter, a user PC) 100, 100, . . . , digital cameras (electronic cameras) 120, 120, . . . , each of which is connected to a user PC 100 through a cradle 110 and can take a moving image, a server 130 for a videoconference (hereinafter, a VC server), a management server 140 which manages the personal information of users and the like, and a communication network such as the Internet 150 that connects these user PCs 100, 100 . . . , the VC server 130, management server 140, and the like.

The user PC 100 can transmit and receive information such as an image through the cradle 110 and a USB cable 122 from the digital camera 120, and further, can transmit and receive information such as an image, and voice through the Internet 150.

In this user PC 100, a program for image display for displaying in a list an image recorded in a recording medium in the digital camera 120, or an image recorded in a recording medium in the user PC 100, and a program for videoconference that is a program for holding a videoconference and relates to the present invention are installed. Furthermore, the program for image display, and the program for videoconference will be described later in detail.

The cradle 110 is connected to the user PC 100 and communication cable (in this embodiment, a USB cable) 112 with which duplex communication is possible, and is given DC power from an AC adapter 114.

The cradle 110 has a concavity 110A guiding the digital camera 120 at the time of detaching the digital camera 120, and a cradle connector 110B is provided in the bottom face of this concavity 110A. Then, when the digital camera 120 is mounted on the concavity 110A of the cradle 110, a camera connector (not shown) provided in the bottom face of the digital camera 120 is connected to a cradle connector 110B while being interlocked with the mounting operation. When the digital camera 120 is mounted on the cradle 110 and a camera power supply is OFF, a rechargeable battery in the digital camera 120 is charged by DC power supplied from the AC adapter 114, and when the camera power supply is ON, the DC power supplied from the AC adapter 114 is used in preference to the rechargeable battery in the digital camera 120.

The digital camera 120 has a photography mode where a still image or a moving image is taken and is recorded in a memory card, a playback mode where an image recorded in the memory card is read and is displayed on an LCD monitor of the digital camera 120, and a communication mode for transmitting and receiving information such as an image with the user PC 100.

Either of the above-described photography mode and playback mode is selected by the operation of a mode selection lever of the digital camera 120 that is not shown.

On the other hand, the above-described communication mode is automatically set in preference to the photography and playback modes if the digital camera 120 is USB-connected to the user PC 100.

That is, when the digital camera 120 is mounted on the cradle 110, the power supplies of the user PC 100 and digital camera 120 are ON, and the user PC 100 and cradle 110 are connected through the USB cable 112, the digital camera 120 automatically makes the operation mode of the camera be a communication mode (USB mode). The digital camera 120 discriminates USB connection/non-USB connection with the user PC 100 by monitoring ON/OFF of pull-up of a specific USB terminal.

Furthermore, the digital camera 120 acts as a device with two kinds of different device classes according to a USB setting state of a camera body at the time of being USB-connected. That is, in the above-described USB mode, there are a USB mass storage class mode where the digital camera 120 is operated as a card reader, and a videoconference mode where the digital camera 120 is operated as a PC camera, and the digital camera 120 is set beforehand in either of the modes at the time of camera setup. When USB setting is the USB mass storage class mode, the digital camera 120 reads and transmits an image recorded in the memory card in the digital camera 120, and when the USB setting is the videoconference mode, the digital camera 120 transmits a moving image under image pickup in real time so that a videoconference can be held.

On the other hand, the user PC 100 automatically detects the connection of the digital camera 120 (a Plug & Play function is used) when the digital camera 120 is mounted on the cradle 110. When the communication mode of the digital camera 120 is the USB mass storage class mode, the user PC 100 automatically boots the above-described program for image display, and when being the videoconference mode, the user PC 100 automatically boots the above-described program for image display and the above-described program for videoconference. As for the function to automatically detect the connection of the digital camera 120, a device driver that automatically detects the connection of the digital camera 120 is installed at the time of or after the booting of a system program of the user PC 100 to monitor a Plug & Play event of a communication system. When the device driver recognizes the connection of the digital camera 120, the user PC 100 boots a required program according to the processing mode of the digital camera 120. In this embodiment, although the user PC 100 is connected to the cradle 110 by using the communication cable (USB cable) 112, a connection mode is not limited to a wired mode, but both can be also connected by using a wireless communication interface.

Next, the case where the program for image display in the user PC 100 is booted will be described.

Figure 2:
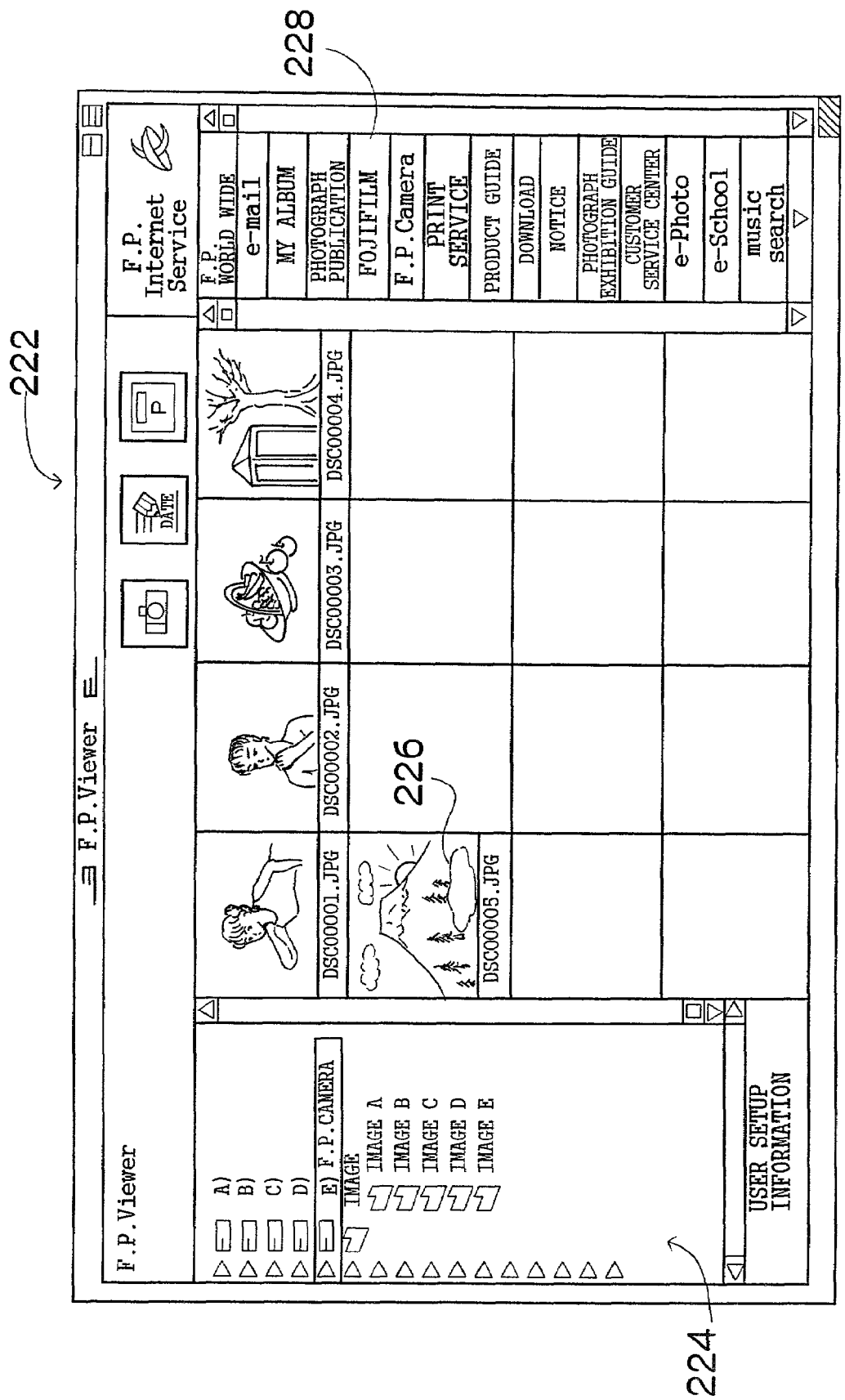
FIG. 2 is a drawing showing an example of a GUI screen of the program for image display.

In this case, a viewer window 222 shown in FIG. 2 is displayed on a display device of the user PC 100. In this viewer window 222, for example, a file list 224 where the identification information of taken image data and incidental information that are currently recorded in the memory card of the digital camera 120 and the identification information of folder names and file names of saved image data and incidental information that are recorded in a database in the user PC 100, a list of compressed images (identification information in thumb nail images) 226 of respective images recorded in a folder which a user specifies for inspection, and various kinds of menu buttons 228 for commanding connection to a server (not shown) which provide various kinds of services such as a print service, and an image storage service are displayed simultaneously.

It becomes possible to upload an image file or a voice file for the transmission of print service information of a desired image, photography publication service on the Internet, and contribution to a photo contest just by a user selecting one or more desired images from the list of file names or the compressed images 226 that are displayed in the viewer window 222 through the use of an input device represented by a mouse or a keyboard, and pushing one of the menu buttons 228 (for example, a print service button, a photograph publication button, and a photo contest contribution button) for commanding the connection and transmission to various kinds of servers.

When a "user registration button" (not shown) is pushed for the first time after the above-described program for image display is installed in the user PC 100, the user PC 100 accesses the management server 140 shown in FIG. 1 to take procedure necessary for user registration. Namely, a user inputs personal information for registration in a user registration page of the management server 140, the personal information including a name, an address, a zip code, an E-mail address, a model of a user's own electronic camera, gender, a telephone number, a birth date, an occupation, a password, etc. User identification information (user ID) is given in exchange for this registration, and hereafter, at the time of access to the management server 140, the user ID is collated for certification. The management server 140 manages personal information of users by using user IDs. Thereby, the menu buttons 228, banner advertising, etc. that are customized for every user can be distributed.

Next, the program for videoconference that is installed in the user PC 100 will be described.

This videoconference program allows users connecting the Internet to have a videoconference with each other by using the videoconference mode of the digital camera 120. As described above, when the digital camera 120 is USB-connected to the user PC 100 in the videoconference mode, this program for videoconference is automatically booted by the Plug & Play function, and if the above-described program for image display has been not booted, the program for image display is also booted simultaneously.

Only when the camera with the videoconference mode is USB-connected, the program for videoconference can operate. That is, the program for videoconference reads a product ID, a maker ID, etc. in a digital camera that is USB-connected, and determines whether the model of the digital camera has a function of treating the above-described program for videoconference. Only when determining that the digital camera can treat the program for videoconference, the program for videoconference can operate. Furthermore, in addition to the above-described function, it is also good to make the program for videoconference be operable only when the program for videoconference determines that the digital camera is a predetermined maker's digital camera.

Figure 3:
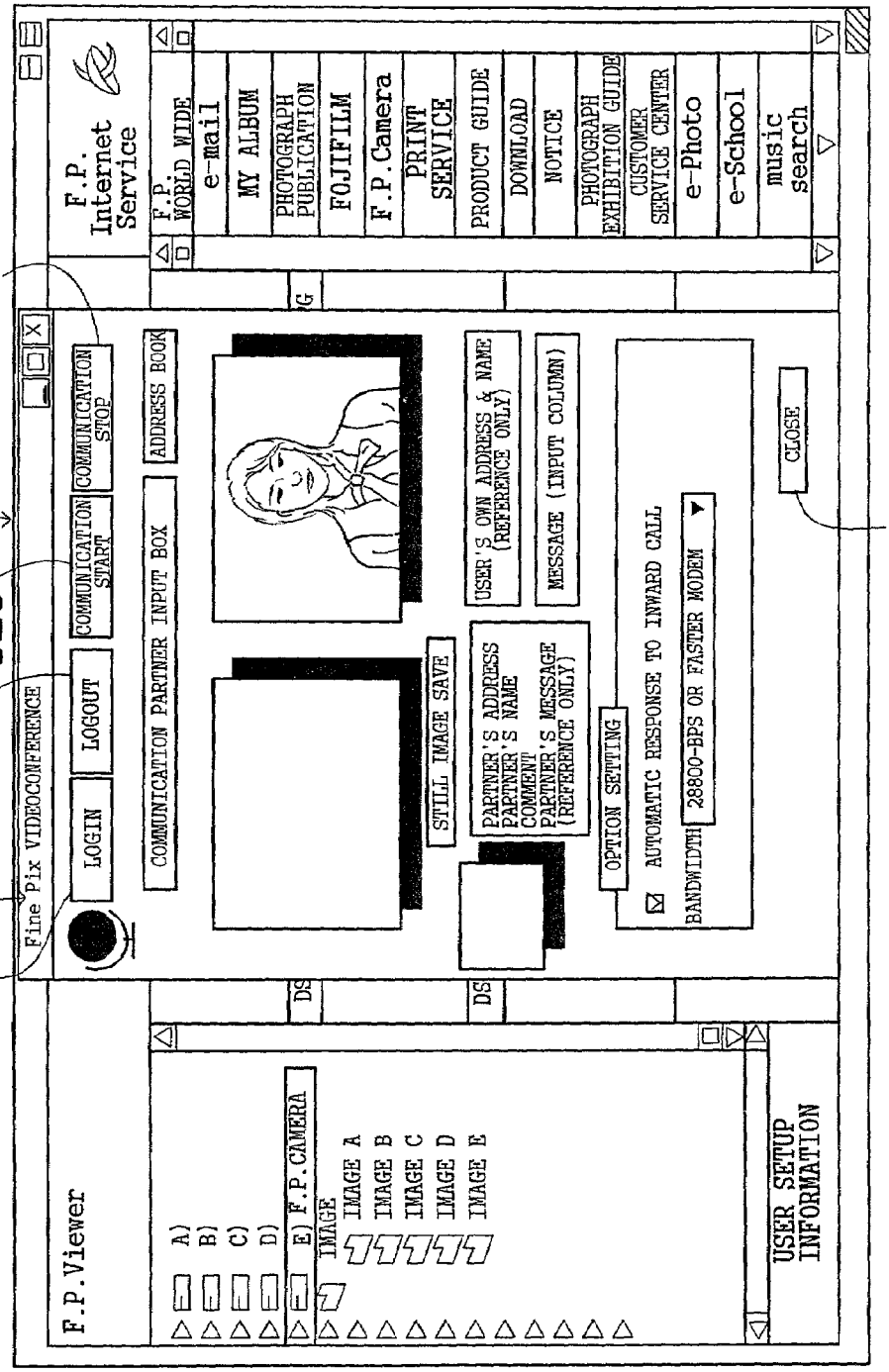
FIG. 3 is a drawing showing a status at the time when a window for a videoconference (VC window) is opened simultaneously with a viewer window.

When the above-described program for videoconference starts, as shown in FIG. 3, on the display device of the user PC 100, a window 300 for a videoconferences (hereinafter, a VC window) is opened as a child window simultaneously with the viewer window 222, and the program for videoconference becomes operable in the state that both windows open. The configuration and its operating method of the VC window 300 will be described later in detail, but will be simply described. At the time of the VC window 300 opening, the program for videoconference does not access the VC server 130 shown in FIG. 1, and the user is under logout. Under this logout, only user's own moving image are displayed, and the VC window 300 can be closed by a Close button 314. The VC window 300 can be opened again by pushing a VC open button on the viewer window 222 (not shown) after closing the VC window 300. While the VC window 300 is opened, an address book can be opened regardless of being under logout or login.

Here, when the user pushes a Login button 316 in the VC window 300, the user is treated as a user under login/waiting. That is, the user PC 100 accesses the VC server 130 to transmit a user ID etc, and in the VC server 130, the user is registered as a user under login/waiting on the basis of the user ID that is received.

As the above-described user ID, the user ID given from the management server 140 at the time of user registration is used after the above-described program for image display is installed in the user PC 100. Therefore, the user does not need to take procedure necessary for user registration after the installation of the program for videoconference to the user PC 100. If there is no user ID when a Login button is pushed, the dialog display of a warning message that urges user registration is given by the program for an image display.

Furthermore, when the user specifies the address of a communication place under the above-described login and waiting and pushes a Communication start button 320, or when the user's address is specified from a partner and a Communication start button is pushed, the user PC 100 becomes under login/communication. Since the VC server 130 is informed of whether a user is under waiting or communication, the VC server 130 manages in which status the user under login is. Furthermore, if a Logout button 318 is pushed during login/waiting or login/communication, the status of the user PC 100 becomes under logout and the registration of the user by whom the logout button 318 is pushed is deleted in the VC server 130.

Moreover, if a Communication stop button 322 is pushed during login/communication, the status become under login/waiting, and in the VC server 130, the user status under management is changed from the login/communication to the login/waiting.

Figure 4:
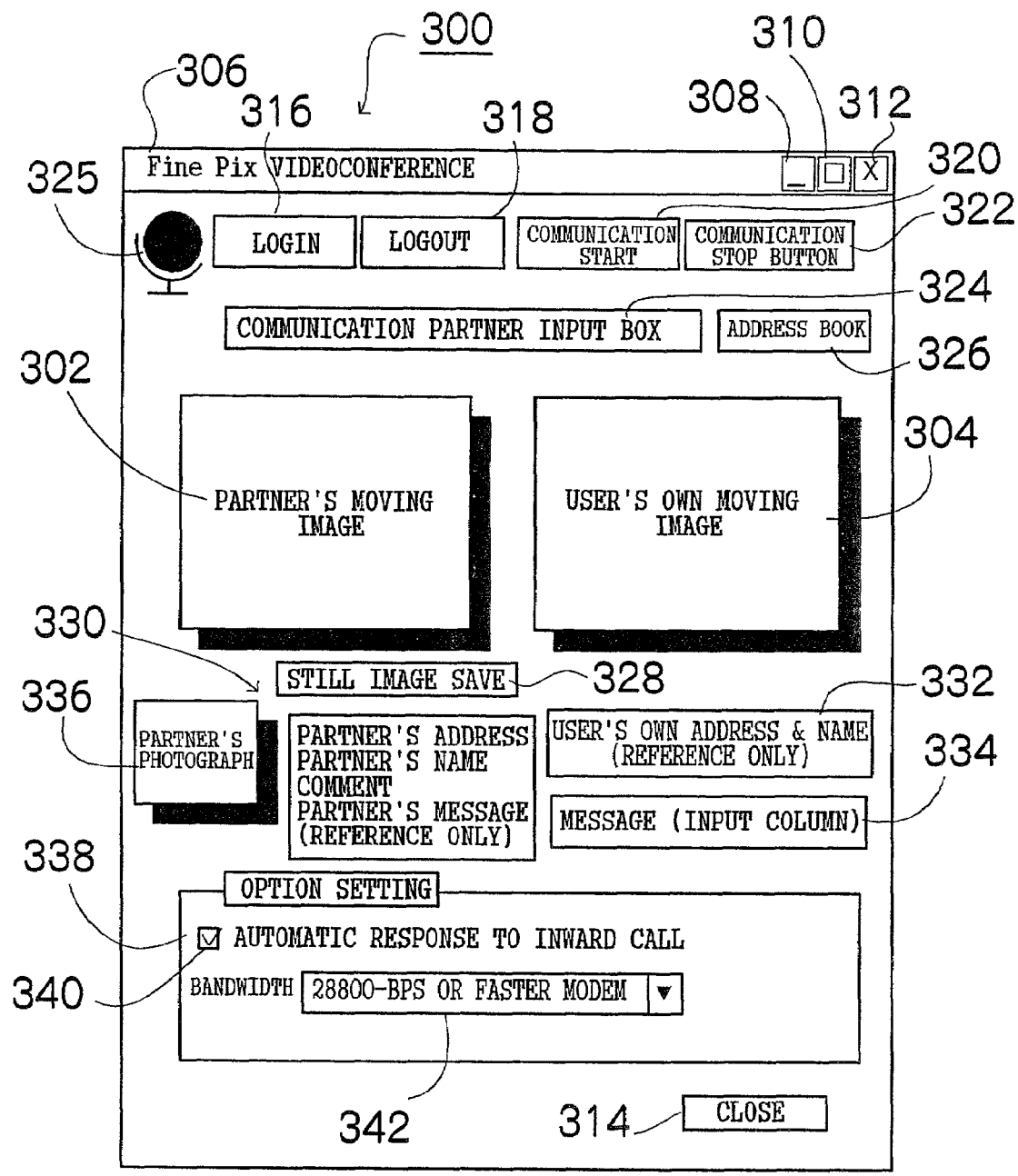
FIG. 4 is an enlarged view of the VC window in this embodiment.

FIG. 4 is an enlarged view of the VC window 300. The VC window 300 has a partner's moving image display section 302 which displays a moving image of the partner under communication, and a user's own moving image display section 304 which displays a moving image of a user who is taking the moving image with the digital camera 120, and these moving image display sections 302 and 304 are arranged in right-hand and left-hand sides respectively. Although each size of the partner's moving image display window and user's own moving image display window is set at fixed size (for example, 160×120 dots) in this embodiment, it is also good to constitute the size so that the display size may be made variable.

The functional name and module version information of the VC window 300 are displayed on the title bar 306 of the window, and a minimization button 308, a maximization button 310, and a close button 312 are provided in the right end of the title bar 306. The close button 312 is equivalent to the Close button 314 arranged at the lower right of the window, and a push of either of these buttons 312 and 314 performs the processing of closing the VC window 300. The maximization button 310 is dimmed (grayout-displayed) lest maximization processing should be accepted. The minimization button 308 functions effectively, and if the button 308 is pushed, the VC window 300 is minimized.

Operation buttons such as the Login button 316, Logout button 318, Communication start button 320, and Communication stop button 322, and a Communication partner input box 324 are provided below the title bar 306.

Since a user does not access a network when the VC window 300 is opened, the partner's moving image display section 302 displays a blank or a predetermined icon (for example, an icon which is a person's silhouette that is designed), and the user's own moving image display section 304 displays user's own moving image which is taken with the digital camera 120.

The user PC 100 is connected to the VC server 130 by a push of the Login button 316 for ILS (Internet Location Server) registration. In the case of a user under dial-up connection, a telephone is called at this time, and a user PC 100 of the user is connected to the Internet. During login, an indicator (icon) 325 is displayed on the upper left of the window to show that a current status is under ILS login. Only during login, the start/stop of communication can be repeated. This user PC 100 is deleted from ILS by logout.

A communication partner's address is inputted into the communication partner input box 324 after login. For example, it is possible to directly input the IP address (for example, 133.170.49.153) of the computer that serves as a communication partner, or the e-mail address (for example, "fgate@test.fujifilm.co.jp") of a partner. The partner's e-mail address is automatically inputted into the communication partner input box 324 by clicking the Address book open button 326 provided in the right of the communication partner input box 324 to open the window screen (refer to FIG. 5) of the address book, and a partner is selected from the lists. The address book will be described later in detail.

Since the address of the partner with whom the user communicated last time is kept in the communication partner input box 324 as a default value at the time of starting the VC window 300, what is necessary is just to click the Communication start button 320 in the case of the call to the same partner.

As for users of the Internet in normal dial-up connection, each IP address is changed for every connection to a provider, and further, there are many users who do not know a confirmation method of their own current IP addresses. Hence, in most cases, it is assumed that e-mail address inputs are used. Since the address at the time of user registration in the program for image display is automatically reflected as an e-mail address, the communication by this system cannot be performed unless the user registration is correctly performed to the management server 140.

When the Communication start button 320 is pushed after the address is inputted into the communication partner input box 324, a telephone call is performed to the address of the communication partner concerned, and communication is started if the partner responds. If no response comes within predetermined time after a communication call started, a message box showing the notification of "No response" is displayed on a display device of the user PC 100.

When communication is established by the partner responding to the telephone call, the moving image sent by the partner is displayed in the partner's moving image display section 302. Although a microphone and a loudspeaker that are attached to an user PC 100 performs audio input and output, it is also good to use a microphone and a loudspeaker that are built in the digital camera 120 or are external ones.

In the VC window 300, a Still image save button 328 is provided in the lower part of the partner's moving image display section 302. When the Still image save button 328 is pushed while the communication partner is being displayed, moving image display is stopped and a snapshot (still image) can be taken. Then, the moving image display is resumed and a dialog (not shown) of inquiring the processing method of the static image is displayed. In this dialog, selection candidates such as "Copying to clipboard", and "Sticking on partner image column of address book" for the still image fetched are shown, and the user can select any processing.

One frame image (still image) of the communication partner is saved in the user PC 100 by being associated with the address of the concerned partner in the address book by the user selecting "Sticking on partner image column of address book". Thereby, a partner's photograph is hereafter displayed in the VC window 300 at the time of opening the address book, and being under communication. Although an image fetched by a still image save function is recorded by being associated with a partner's address in this embodiment, a method of association is not limited to this, but what is necessary is just to record the image by associating the image with certain information, with which a user can be specified, such as a user ID issued in user registration.

In the VC window 300, below the partner's moving image display section 302, a communication partner information display section 330 is provided. Below the user's own moving image display section 304, a user's own information display section 332 and a message input box 334 are provided. The communication partner information display section 330 is an area which displays the information about the partner under communication, and partner's address and name, a comment about the partner, a message written by the partner, the partner's image (80×60 dots), etc. are displayed in the communication partner information display section 330. The e-mail address that the user registered is displayed here as a partner's address becomes a specific handle name of the communication partner. The name registered is displayed as a name. The comment is written by the user about the partner, and the contents of the comment appended to the address book as information about a partner are displayed. The contents that are inputted by the partner in a partner's message input box are displayed as the message.

The image (still image) stuck on the address book is displayed in a partner's image display section 336. When there is no pasted image of the partner in the address book, a blank or a predetermined icon (a person's silhouette icon etc.) is displayed.

The user's own information display section 332 provided below the user's own moving image display section 304 is an area where information about the user's own registration contents is displayed, and an address and a name (these are the same as the contents of user registration) are displayed. Since the setting of user's own information is automatically fetched from the information of user registration, a setup function of user's own information is omitted.

A message input box 334 is a column for inputting characters displayed on a partner's screen when the partner looks through a communication partner in an address book, and a message which the user inputs is displayed on a connection partner list of the partner's address book and a communication partner information display section of a partner's VC window.

As shown in FIG. 4, an option setting column 338 is provided in the lower part of the VC window 300. An automatic/manual response switching setup check box 340 and a network band selection box 342 are displayed in this option setting column.

The automatic/manual response switching setup check box 340 is a user interface for selecting whether an inward response is automatically performed when a telephone call comes from a partner. When a check mark is removed and "manual response" is selected, a dialog showing an incoming call pops up when a telephone call comes from the partner, and the user can select acceptance or refusal each time. On the other hand, when a check box is marked to select "automatic response", a telephone call from the partner is promptly accepted without a dialog.

When a downward triangle mark (▼) at the right end of the network band selection box 342 is clicked, a drop down list (pull-down menu) appears. Selection candidates such as a 28800-bps or faster modem, ISDN, and LAN, are displayed in the drop down list. The user selects an item near the bandwidth of a user's network environment from the drop down list.

Figure 5:
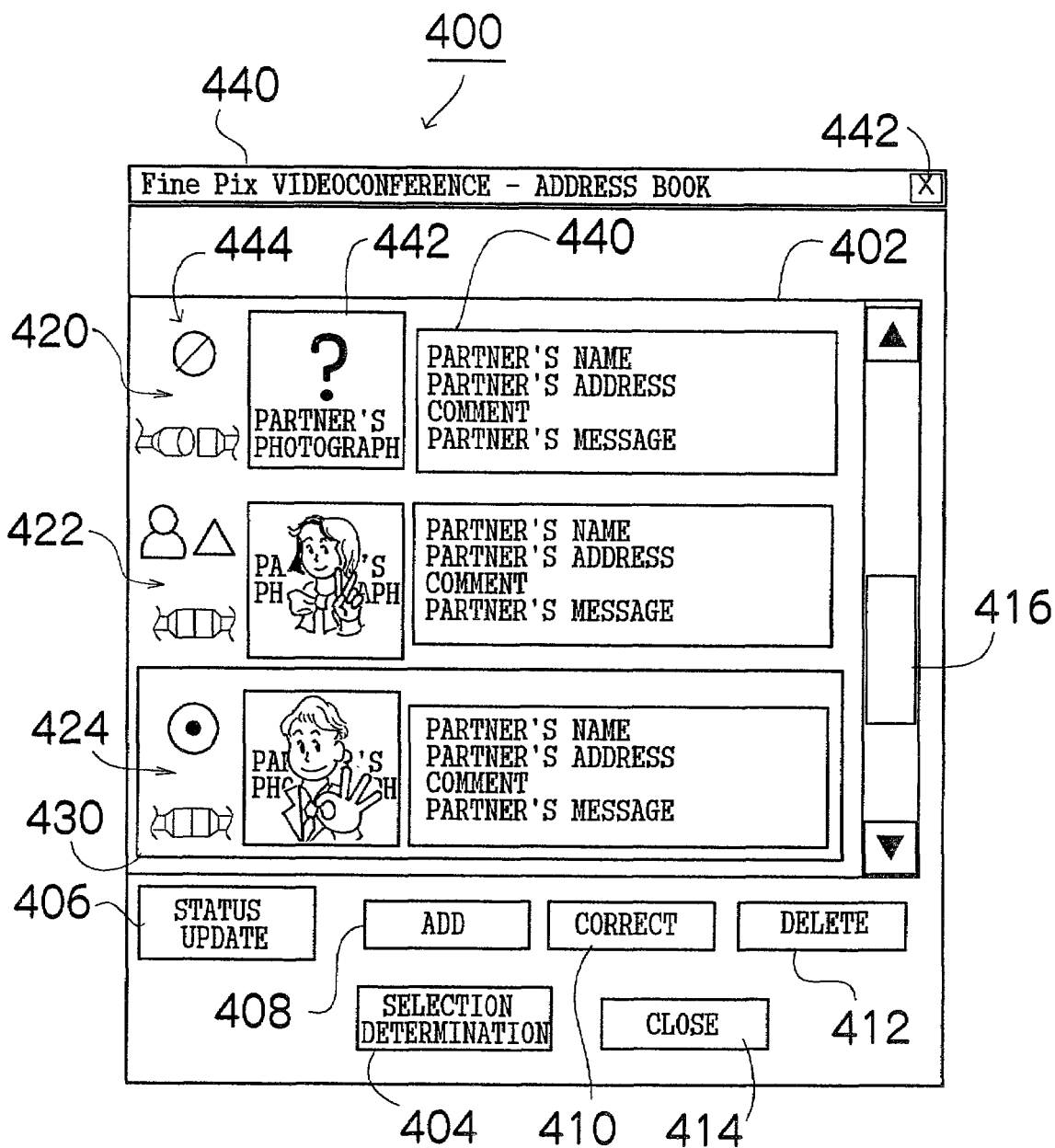
FIG. 5 shows an example of an address book window.

FIG. 5 shows an example of an address book window 400. When the address book open button 326 described in FIG. 4 is pushed, an address book is opened, and the address book window 400 is displayed on the display device of the user PC 100. As shown in FIG. 5, the address book window 400 has a display section (hereinafter, a partner list display section) 402 that displays a partner list, and various kinds of operation buttons 404, 406, 408, 410, 412, and 414.

The contents displayed in the communication partner information display section 330 described in FIG. 4 become a record of each partner, and a list of the records is displayed in the partner list display section 402. This is configured so that, if there are a large number (a registration number of users in the address book) of records, records are displayed in a displayable range, and display objects can be also changed with a scroll bar 416. It is possible to freely set the display order of the records, that is, in the alphabetic sequence of names or addresses, the order of registration dates to the address book, the order of usage frequencies, or the order of statuses.

In the partner list display section 402, a status of whether each is presently opening a VC window is displayed by each of icons 420, 422, and 424 for each partner on the list. This is realized by the user PC 100 accessing the VC server 130 and acquiring the ILS registration information when the address book is opened. The user PC 100 inquires the partners, registered into the address book, of the VC server 130, and displays statuses of only the partners, who are registered in the address book, among those who are given ILS registration.

The status is classified into three kinds as follows:
(1) Offline (status where the VC window is not opened),
(2) Online (under communication with someone),
(3) Online (without communication)

In FIG. 5, reference numeral 420 denotes an offline icon, reference numeral 422 denotes an online (under communication with someone) icon, and reference numeral 424 denotes an on-line (without communication) icon.

Neither a partner in the offline status nor a partner, who is already communicating with someone even if the partner is in the online status, can select as a communication partner, but only a partner in the online (without communication) status is ready for communication acceptance. Hence, also on the user interface of the address book, selectional restriction is controlled so that a partner concerned on the address book cannot be selected as a communication partner unless the partner is in the status ready for communication acceptance.

A record of any one of partners, who are ready for communication acceptance, in the list is clicked to be highlighted (for example, a cursor frame 430 is displayed), and then, when a Selection determination button 404 is pushed, the address of the partner relating to the record concerned is inputted into the communication partner input box 324 described in FIG. 4. A double-click of a record in the list exhibits the same effect as the push of the Selection determination button 404.

As for the record of a partner who cannot be selected, even if it the Selection determination button 404 is selected after highlighting, the processing of writing the address in the communication partner input box 324 is not performed, but the processing of displaying on a computer screen the dialog of a warning message that the partner cannot be selected is performed.

Each partner's status on the list is the status at the time of the address book being opened. It is possible to update status display by inquiring all the partners of the VC server 130 again through the use of a Status update button 406.

In the partner list display section 402, since a partner information display section 440, a partner photography display section 442, and a status display section 444 are included for every partner, the partner's status can be easily grasped with partner information.

Figure 6:
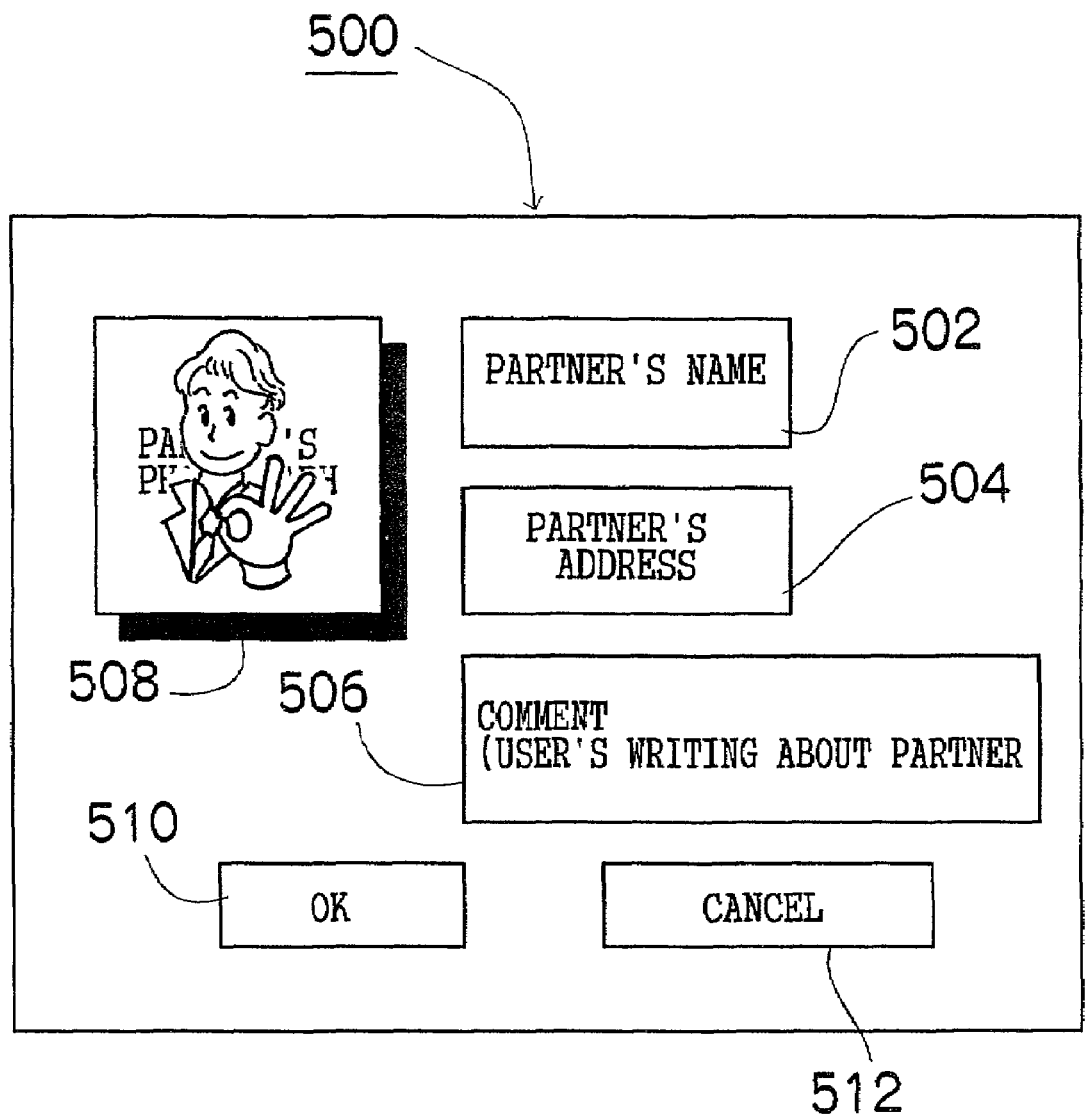
FIG. 6 shows an example of an addition form of a record in the address book.

The contents of the address book can be edited by operating an Add button 408, a Correct button 410, and a Delete button 412 in the address book window 400. When the Add button 408 is pushed, a form for registering a new partner is displayed. An example of the form is shown in FIG. 6. A name column 502, an address column 504, a comment column 506, and a photograph pasting column (partner image column) 508 are provided in the form 500.

A partner's name is inputted into the name column 502. Anything is acceptable as contents here inputted since it is what is saved in the inside of the user PC 100 as local information in the user's own computer, and this does not relate to the name which the partner registered at the time of user registration in the management server 140. It is necessary to input the e-mail address, which the partner registered at the time of user registration in the management server 140, in the address column 504. It is possible to input a comment about a partner into the comment field 506. Anything is acceptable as contents, inputted in the comment column 506, since it is what is saved as local information in the user's own computer, and this does not relate to the message which the partner sets by herself/himself. Since there is no partner image in the record at the time of addition as an initial state, an icon of a person's silhouette is displayed in the photograph pasting column 508. As described in FIG. 4, it is possible to fetch a partner's image into the address book by pushing the Still image save button 328 during communication.

When at least a name and an address are inputted into an addition form 500 shown in FIG. 6 and an OK button 510 is pushed, the record is added. If a Cancel button 512 is pushed before pushing the OK button 510, record creation processing is canceled.

When the Correct button 410 is pushed in the address book window 400 shown in FIG. 5 after a record for correction is selected, the dialog that is the same as that in the description in FIG. 6 and relates to the record concerning the selection is displayed to make it possible to change the written contents such as the partner's name, address, and comment. If a record registered into the address book is deleted, the Delete button 412 is clicked after the record for deletion is selected from the lists shown in FIG. 5. A confirmation dialog in a message is displayed on the screen of the user PC 100 according to a push of the Delete button 412 (for example, an OK button and a Cancel button are displayed with the message "Deletion of this is OK?"). When the user inputs the command of execution agreement, the processing of deleting the record concerned is performed.

When the Close button 414 provided in the lower right of the address book window 400 or the close button 442 at the right end of the title bar 440 is pushed, the address book is closed. In this embodiment, unless the address book window 400 is closed, the VC window 300 described in FIG. 4 cannot be operated.

Furthermore, since the address book of this embodiment has an automatic registration function, a dialog which asks whether registration to the address book is required is displayed if a user is communicating with a partner who is not listed in the address book at the time of the termination of communication also including termination caused by the termination of the program for image display or the VC window 300. If the user selects "YES (OK)", the record addition dialog that is described in FIG. 6 is displayed. In the addition dialog displayed at this time, the address of the partner who was under communication is posted at a default value, and if still image was saved during communication, the image is also posted to the photograph pasting column.

Figure 7:
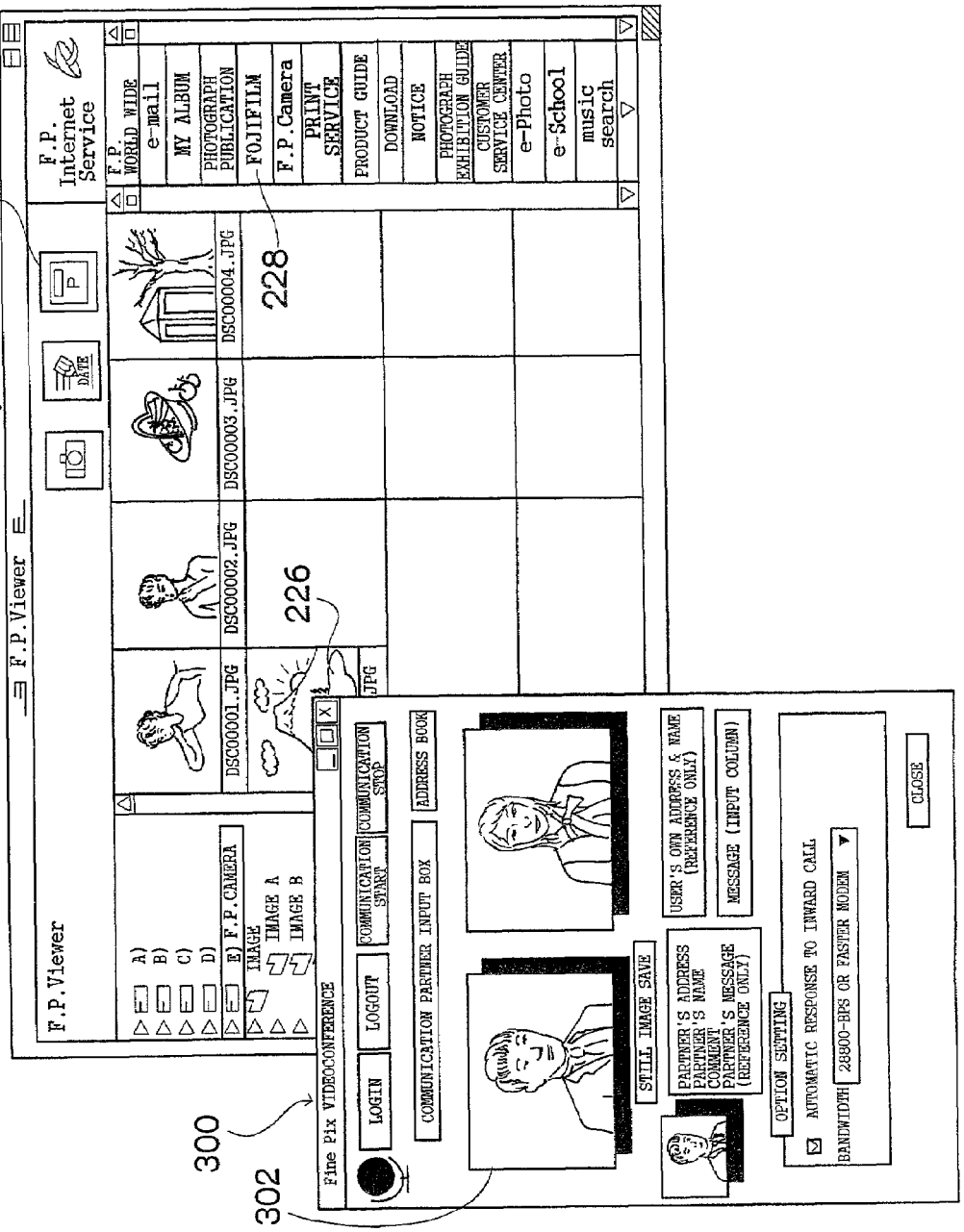
FIG. 7 is an explanatory diagram used for explaining the mutual operation of the viewer window and VC window.

Next, the mutual operation of the viewer window 222 and VC window 300 will be described. As shown in FIG. 7, the viewer window 222 and VC window 300 can be operated respectively in the status that both are opened. When one or more compressed images (thumb nails) 226 on the viewer window 222 are selected during a videoconference and a VC file transfer button 280 is clicked, an image file concerning the selection is transmitted to the partner under communication. It is possible to configure such a user interface that an image file concerning the selection is transmitted to the partner by dragging & dropping the compressed image 226 selected in the viewer window 222 into the partner's moving image display section 302 of the VC window 300.

A progressive dialog relating to the file under reception is displayed in a partner's (a receiving user) user PC at the time of performing VC file transfer, and a folder which includes the received file at the time of the completion of the transfer becomes in a selection status automatically. In consequence, in the partner's viewer window, the thumbnail image of the received file is displayed in a list display section. The partner receiving the file can confirm the contents of the received file by selecting the thumb nail image of the received file if necessary.

It is possible to transmit various kinds of files besides a still image file to a communication partner in a videoconference by using procedure being the same as the transfer procedure of a still image file by displaying icons of a moving image file, a voice file, a document file, and the like on the list display section of the viewer window 222.

When the VC window 300 is open at the time of closing the viewer window 222, the VC window 300 is closed automatically by following the termination processing of the viewer window 222. When the VC window 300 is closed by following the termination of the viewer window 222, the processing of compulsorily cutting connection is performed if the status is under communication.

As described above, according to the present invention, since a program for videoconference is automatically booted just by connecting an electronic camera to a computer (mounting on a cradle), complicated operation is unnecessary, and a user can easily participate in a videoconference. Since user's personal information at the time of user registration in another program is used in the program for videoconference, it is not necessary to perform user registration anew, and hence, time and effort can be saved.

Furthermore, it is possible to easily search a partner with whom a user can communicate just by opening a user's own address book, and moreover, it is possible to easily send an image to a communication partner during a videoconference. It is possible to fetch a still image or a part of a moving image from the moving image, which shows a communication partner, during communication, and to incorporate the image into a communication partner address book.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A videoconference system, comprising:
   computers of users, the computers enabling communication with each other via a communication network; and
   electronic cameras of the users, the electronic cameras enabling a moving image to be taken, the electronic cameras being respectively connected to the computers duplex-communicably, wherein:
   the videoconference system makes a videoconference possible by making a moving image, taken by the electronic camera of each user, displayed on a display device of a computer of a communication partner;
   the computer has a program for videoconference which performs the videoconference;
   the computer further has a program for image display; and
   the program for videoconference and the program for image display are automatically booted when it is detected that the electronic camera is connected duplex-communicably;
   wherein the program for image display makes the computer execute a function of making a display device of the computer simultaneously display a list of images recorded in a recording medium in the electronic camera or recorded in a recording medium in the computer; and
   wherein the program for videoconference makes the computer execute, when an image is selected from the list of images during communication and image transmission is commanded, a function of making the selected image transmitted to a communication partner.

2. The videoconference system according to claim 1, wherein:
   the electronic camera has a photography/playback mode, and a communication mode where either of a videoconference mode where the electronic camera is made to operate as the electronic camera for the computer, and a mass storage class mode where the electronic camera is made to operate as a card reader is set;
   the electronic camera automatically sets itself in the communication mode when detecting that the electronic camera is connected to the computer duplex-communicably; and
   the computer automatically boots the program for videoconference when the communicate mode that is set is the videoconference mode.

3. The videoconference system according to claim 1, wherein the program for image display makes the computer execute:
   a function of making a display device of the computer simultaneously display a list of images recorded in a recording medium in the electronic camera, and a menu button for commanding the computer to connect with a server performing various kinds of services; and
   a function of making the server that is selected by the menu button transmit an image selected from the list of images.

4. The videoconference system according to claim 1, further comprising:
   a cradle on which the electronic camera is detachably mounted; and
   a communication cable which connects the cradle with the computer,
   wherein the cradle connects the electronic camera with the communication cable when the electronic camera is mounted.

5. The videoconference system according to claim 4, wherein:
the electronic camera has a photography/playback mode, and a communication mode where either of a videoconference mode where the electronic camera is made to operate as the electronic camera for the computer, and a mass storage class mode where the electronic camera is made to operate as a card reader is set;
the electronic camera automatically sets itself in the communication mode when detecting that the electronic camera is connected to the computer duplex-communicably; and
the computer automatically boots the program for videoconference when the communicate mode that is set is the videoconference mode.

6. The videoconference system according to claim 4, wherein the program for image display makes the computer execute:
a function of making a display device of the computer simultaneously display a list of images recorded in a recording medium in the electronic camera or recorded in a recording medium in the computer, and a menu button for commanding the computer to connect with a server performing various kinds of services; and
a function of making the server that is selected by the menu button transmit an image selected from the list of images.

7. A videoconference system, comprising:
computers of users, the computers enabling communication with each other via a communication network; and
electronic cameras of the users, the electronic cameras enabling a moving image to be taken, the electronic cameras being respectively connected to the computers duplex-communicably, wherein:
the videoconference system makes a videoconference possible by making a moving image, taken by the electronic camera of each user, displayed on a display device of a computer of a communication partner;
the computer has a program for videoconference which performs the videoconference; and
the computer makes the program for videoconference operate only when it is detected that the electronic camera is connected duplex-communicably and is a predetermined model.

8. The videoconference system according to claim 7, wherein the predetermined model of electronic camera is one of an electronic camera that has a function of treating the program for videoconference, and an electronic camera that has a function of treating the program for videoconference and is produced by a predetermined manufacturer.

9. A video conference system, comprising:
computers of users, the computers enabling communication with each other via a communication network; and
electronic cameras of the users, the electronic cameras enabling a moving image to be taken, the electronic cameras being respectively connected to the computers duplex-communicably, wherein:
the videoconference system makes a videoconference possible by making a moving image, taken by the electronic camera of each user, displayed on a display device of a computer of a communication partner;
the computer has a program for videoconference which performs the videoconference; and
the program for videoconference makes the computer perform a function of using personal information of the user at the time of user registration by another program.

10. The videoconference system according to claim 9, wherein the other program is a program for image display simultaneously booted at the time of the program for videoconference being booted.

11. The videoconference system according to claim 10, wherein the program for image display makes the computer execute:
a function of making a display device of the computer simultaneously display a list of images recorded in a recording medium in the electronic camera or recorded in a recording medium in the computer, and a menu button for commanding the computer to connect with a server performing various kinds of services; and
a function of making the server that is selected by the menu button transmit an image selected from the list of images.

12. The videoconference system according to claim 11, wherein the program for videoconference makes the computer execute, when an image is selected from the list of images during communication and image transmission is commanded, a function of making the selected image transmitted to a communication partner.

13. An image transmitting method for transmitting an image, which a user specifies in a videoconference, to another user's communication equipment, comprising:
a step of the other user's communication equipment and the user's own communication equipment performing videoconferencing by displaying, on a display device of the user's own communication equipment, at least a moving image display section representing the other user;
a step of displaying at least one image as at least one image menu on the display device of the user's own communication equipment;
a step of selecting an image, transmission of which the user expects, from the image menu during the communication;
a step of the user commanding transmission of the selected image by dragging the selected image to the moving image display section and dropping the selected image thereon, using a user interface of the user's own communication equipment; and
a step of transmitting the selected image, to the other user's communication equipment as a result of the user commanding transmission the selected image.

14. A videoconference system, comprising:
computers of users, the computers enabling communication with each other via a communication network; and
electronic cameras of the users, the electronic cameras enabling a moving image to be taken, the electronic cameras being respectively connected to the computers duplex-communicably, wherein:
the videoconference system makes a videoconference possible by making a moving image, taken by the electronic camera of each user, displayed on a display device of a computer of a communication partner; and
the computer has a program for videoconference which performs the videoconference, wherein:
the electronic camera has a photography/playback mode, and a communication mode where either of a videoconference mode where the electronic camera is made to operate as the electronic camera for the computer, and a mass storage class mode where the electronic camera is made to operate as a card reader is set;
the electronic camera automatically sets itself in the communication mode when detecting that the electronic camera is connected to the computer duplex-communicably; and the computer automatically boots the program for videoconference when it is detected that the electronic camera is connected duplex-communicably and when the communication mode that is set is the videoconference mode.

15. A method for transmitting an image in a videoconference, comprising the steps of:
enabling communication between computers of communication partners via a communication network;
connecting at least one electronic camera enabled to take a moving image to at least one of the computers;
detecting whether the camera is connected to the computer duplex-communicably;
automatically booting a program for performing a videoconference and a program for image display when the at least one camera is detected to be connected duplex-communicably to the at least one computer;
displaying, via the image display program, a list of images recorded in a recording medium in the electronic camera or recorded in a recording medium in the computer on the display of the computer;
selecting an image from the list of images, via input from a user; and
transmitting the selected image to the computer of the communication partner via the videoconference program.

16. A method for performing a videoconference, comprising the steps of:
enabling communication between computers of communication partners via a communication network;
connecting at least one electronic camera enabled to take a moving image to at least one of the computers;
detecting the camera model and detecting whether the camera is connected to the computer duplex-communicably;
performing videoconferencing by displaying a moving image, taken by the at least one electronic camera of a communication partner, on a display device of a computer of another communication partner,
wherein the computer has a program for videoconference which performs the videoconference and the computer makes the program for videoconference operate only when it is detected that the electronic camera is connected duplex-communicably and is a predetermined model.

17. A method for performing a videoconference, comprising the steps of:
enabling communication between computers of communication partners via a communication network;
connecting duplex-communicably at least one electronic camera enabled to take a moving image to at least one of the computers;
performing a videoconference, using a videoconference program loaded into the computers, by displaying a moving image taken by the at least one electronic camera on a display device of the computer of the communication partner; and
performing, via the videoconference program, a function of using personal information of the user to perform user registration by another program.

* * * * *